Figure 1:
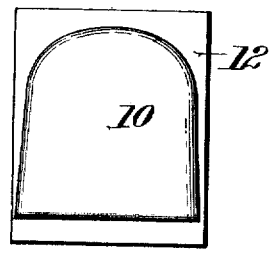

S. S. BLOOM.
ARTIFICIAL TOOTH.
APPLICATION FILED AUG. 14, 1908.

908,643.   Patented Jan. 5, 1909.

Witnesses
C. N. Walker
J. T. Walker

Inventor
S. S. Bloom
By A. W. Harrison
Attorney

UNITED STATES PATENT OFFICE.

SAMUEL S. BLOOM, OF PHILADELPHIA, PENNSYLVANIA.

ARTIFICIAL TOOTH.

No. 908,643.

Specification of Letters Patent.

Patented Jan. 5, 1909.

Application filed August 14, 1908. Serial No. 448,505.

*To all whom it may concern:*

Be it known that I, SAMUEL S. BLOOM, a citizen of the United States, residing at Philadelphia, in the county of Philadelphia and State of Pennsylvania, have invented certain new and useful Improvements in Artificial Teeth, of which the following is a specification.

This invention relates especially to that type of artificial teeth comprising porcelain crowns or facings and metal backing or fastening plates, which have a sliding or dovetailed connection, this construction being employed more particularly for crown and bridge work.

Although, in the accompanying drawings, I illustrate the invention in connection with forms of porcelain bodies and plates which are usually sold to dentists in separate or separable condition, so that the dentist may cut or trim the plates to suit a particular piece of work while the porcelain bodies are removed from the plates, yet I desire to be understood as not limiting myself to the particular embodiment illustrated, as the invention may, obviously be applied to other shapes of tooth bodies and plates.

When a porcelain body having a dovetail groove or rib is baked without such groove or rib having a metal lining or facing, the shrinkage of said body due to the baking operation is liable to change the shape of the groove or rib so that it will not properly slide into engagement with the coacting dovetail rib or groove of the backing or fastening plate. It is therefore customary, in such forms of artificial teeth, to employ a lining or facing of metal, such as platinum, for the groove or rib of the tooth body. Usually the dovetailed sliding connection is provided for by forming the groove in the porcelain and the rib on the plate, and I so illustrate it in the accompanying drawings; but it has been proposed to reverse this relative arrangement of the groove and rib, and therefore I do not limit myself to forming the groove in the porcelain although it is preferable to so make it.

So far as I am aware, the coacting surfaces of the relatively slidable dovetail members of the porcelain body and plate, have been smooth. To secure them together therefore, it has been necessary to employ cement or solder, and cement will not always take a positive and durable hold on such smooth surfaces. One of the objects of my invention therefore is to provide a construction in which the two metallic surfaces which slidingly engage each other will interlock with each other, with or without the addition of cement or solder, the construction being such that if the dentist finds that for some purposes the interlocking of the metal faces directly will perhaps not be sufficient, he may add cement or solder without altering, in any way, the form or structure of the coacting groove and rib.

Another object of the invention is to provide an improved structure of backing or fastening plate having a dovetailed rib especially adapted to coact with a metal-lined groove in a tooth body where the opposing metal faces are formed to interlock.

To these ends the invention consists in the construction and combination of parts substantially as hereinafter described and claimed.

Figure 3:
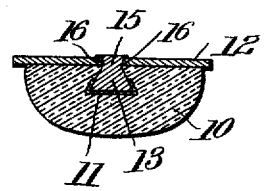
Figure 2:
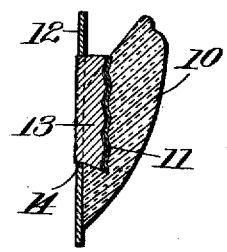
Figure 4:
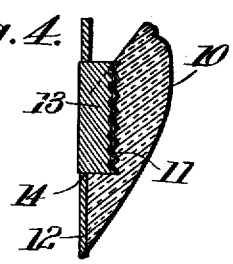

Of the accompanying drawings:—Figure 1 is a front elevation of an artificial tooth and its mount embodying by invention. Figs. 2 and 3 represent respectively a longitudinal section and a transverse section through Fig. 1. Fig. 4 is a view similar to Fig. 2 but representing a modification hereinafter described.

Similar reference characters indicate the same or similar parts in all of the views.

The porcelain tooth body, shown at 10 as a crown or facing, is formed with a dovetail groove having a metal lining 11 which lining is preferably in position when the body is baked and is therefore preferably made of platinum. The face of this lining which forms the bottom of the groove in the completed article is toothed or corrugated.

The backing or fastening plate 12 is provided with a dovetail rib 13 the face of which is toothed or corrugated, the relative positions and forms of the two toothed or corrugated faces being such that they can be forced past each other when slidingly interengaged, and will be in interlocked positions when the lower end of the rib reaches the bottom end of the groove as shown in Fig. 2.

The dentist may, when occasion requires, apply cement or solder before sliding the parts together.

The rib 13 is preferably not integral with the plate 12. A more economical way to make the plate 12 with an accurately formed rib is to construct them separately, the teeth or corrugations of the rib being formed before it is secured to the plate. To provide a firm and reliable connection between the two, I form the plate with an elongated slot 14, and the rib with a projection 15 which accurately fits said slot and is of a slightly greater height than the thickness of the plate, shoulder 16 being formed at the sides. When the projection 15 is passed through the slot 14 until the shoulders 16 bear on one face of the plate around the slot, the tip of the projection is headed down around the margin of the slot against the other face of the plate, thus practically riveting the rib to the plate. This structure enables the ribs to be formed accurately with a face that will interlock with the lining 11 in the manner described, while it would be difficult, if not impossible, to get the same degree of accuracy on the face of a rib bent up from a portion of the plate itself.

The interlocking opposing faces may comprise rounded corrugations as indicated in Fig. 2, or angular ones as indicated in Fig. 4.

Having now described my invention, I claim:—

1. An artificial tooth body and its mount having a dovetail rib and recess connection adapted to be assembled by a vertical sliding movement, the rib and recess having transverse opposing faces formed to interlock.

2. An artificial tooth body having a dovetail metal-lined groove, and a backing or fastening plate having a rib to coact with said groove, the lining of said groove and the surface of the rib having transverse projections.

3. An artificial tooth body having a dovetail groove provided with a transversely corrugated metal lining.

In testimony whereof I affix my signature in presence of two witnesses.

SAMUEL S. BLOOM

Witnesses:
M. L. MARGOLIN,
ALEX. W. WEIDENFELD.